No. 843,687. PATENTED FEB. 12, 1907.
J. H. MORRISON.
POWER TRANSMISSION GEAR.
APPLICATION FILED JAN. 29, 1906.
2 SHEETS—SHEET 1.
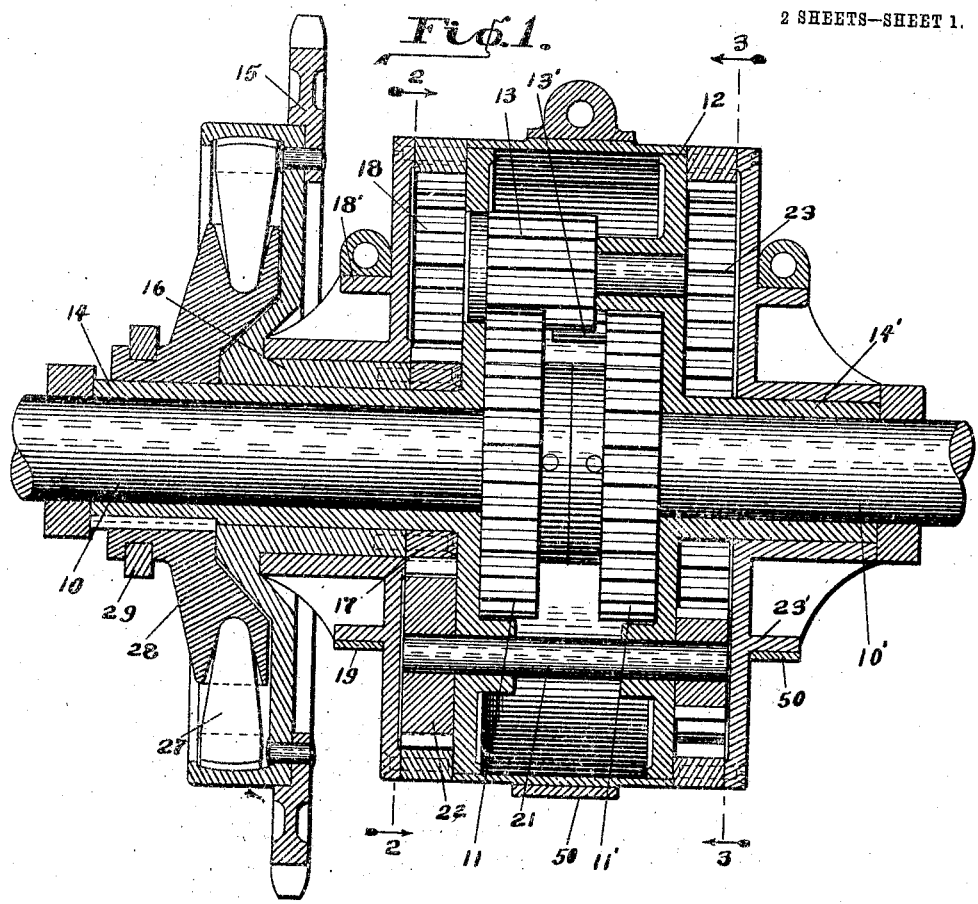
Witnesses
V. Plummer
Thomas H. McMeans
Inventor
Joshua H. Morrison
By Bradford & Hood
Attorneys No. 843,687. PATENTED FEB. 12, 1907.
J. H. MORRISON.
POWER TRANSMISSION GEAR.
APPLICATION FILED JAN. 29, 1906.
2 SHEETS—SHEET 2.
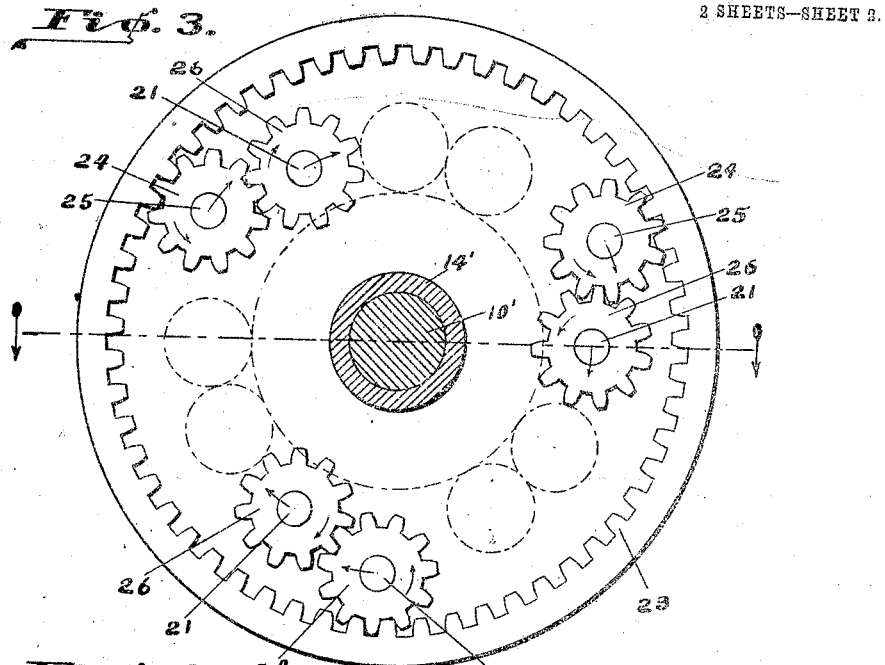
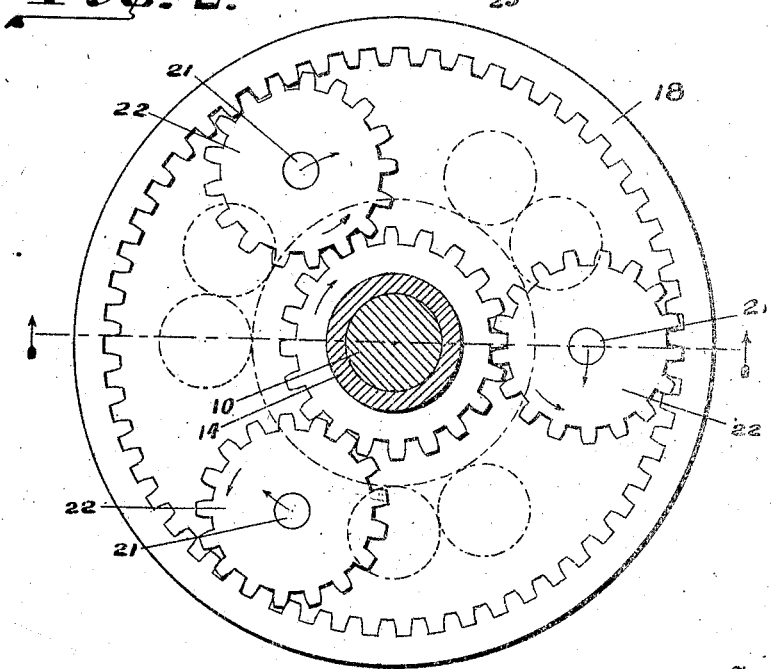
Witnesses
I. Plummer.
Thomas N. McMeans.
Inventor
Joshua H. Morrison.
By Bradford Hood
Attorney

UNITED STATES PATENT OFFICE.

JOSHUA H. MORRISON, OF CONNERSVILLE, INDIANA, ASSIGNOR TO CONNERSVILLE MOTOR VEHICLE COMPANY, OF CONNERSVILLE, INDIANA, A CORPORATION OF INDIANA.

POWER-TRANSMISSION GEAR.

No. 843,687.	Specification of Letters Patent.	Patented Feb. 12, 1907.

Application filed January 29, 1906. Serial No. 298,883.

*To all whom it may concern:*

Be it known that I, JOSHUA H. MORRISON, a citizen of the United States, residing at Connersville, in the county of Fayette and State of Indiana, have invented certain new and useful Improvements in Power-Transmission Gears, of which the following is a specification.

The object of my invention is to produce, preferably as a single and unitary structure, a speed-changing gearing coaxial and immediately associated with a compensating gearing for use in driving automobiles and other similar motor-vehicles.

The accompanying drawings illustrate my invention.

Figure 1 is an axial section of an embodiment of my invention; Fig. 2, a transverse section on line 2 2 of Fig. 1, and Fig. 3 a similar section on line 3 3 of Fig. 1.

In the drawings, 10 and 10' indicate the two coaxial sections of the main drive-shaft of the vehicle, being either the rear-wheel shafts or a suitable jack-shaft connected with the driving-wheels. Each of the shafts 10 and 10' carries at its inner end a gear 11 or 11', respectively, which gears are the main gears of a standard compensator.

In the drawings I have illustrated a compensator of a common type, consisting of a main body or casing 12, within which are mounted several pairs of idler-gears 13 and 13', each pair of gears 13 and 13' connecting the two gears 11 and 11'. The particular form of compensator plays no part in my present invention, and it is to be understood that any other suitable form may be used without departing therefrom. The body 12 is provided with oppositely-extending sleeves 14 and 14', which are sleeved upon the shafts 10 and 10', respectively, adjacent the gears 11 and 11', respectively. Sleeved upon the sleeve 14 is the driving sprocket or gear 15, provided with a sleeve-hub 16, which is sleeved upon sleeve 14 and carries a pinion 17 at its end. Sleeved upon sleeve 16 is an internal gear 18, which is arranged in alinement with pinion 17. The gear 18 is provided with a flange 18', adapted to be engaged by a suitable clamp or holder member 19. Journaled in the body 12 are several planetary shafts 21, each of which carries at one end a pinion 22, which meshes with the internal gear 18 and the pinion 17.

Sleeved upon sleeve 14' is an internal gear 23, and meshing with said gear are several idler-pinions 24, which are journaled upon studs 25, carried by casing 12. Each of the idlers 24 meshes with an adjacent pinion 26, each carried by one of the planetary shafts 21. Gear 23 is provided with a flange 23', adapted to be clamped by a clamp 50.

Any suitable means may be used to clutch the driving-wheel 15 to the compensator, and in the drawings I have shown a friction-clutch 27, having a member 28, which is splined upon sleeve 14 and shiftable longitudinally thereof by a yoke 29 to connect the driving-wheel 15 to the sleeve 14 or to permit said driving-wheel to turn loosely upon the sleeve 14. A brake 51 is arranged to act against the main body of the compensator.

The operation is as follows: Supposing member 28 to be shifted to the left in Fig. 1, this will permit the driving-wheel 15 to rotate freely upon sleeve 14. If said wheel be rotated so as to rotate the pinion 17 in the direction indicated by the arrow in Fig. 2, this will cause a rotation of gears 22 in the directions indicated by the arrows in Fig. 2, and if the internal gears 18 and 23 be free to rotate there will be no rotation of the casing or main body 12, and hence no rotation of shafts 10 and 10'. The pinions 26 will also rotate in the direction indicated by the arrows in Fig. 3, and the intermediate gears 24 will be rotated in the opposite direction and internal gear 23 will be rotated freely about sleeve 14'.

If the clamp 20 be clamped upon the flange 18' of gear 18, said gear will be held stationary, and the rotation of gears 22 will cause a planetary movement of said gears in the direction indicated by the arrow in Fig. 2, thus driving the compensator-body 12 in a forward direction at a low speed. Similarly if clamp 20 be released and clamp 50 be clamped upon the flange 23' of gear 23 there will be a planetary movement of shafts 21 in the direction indicated by the arrows in Fig. 3, thus causing a reverse rotation of the compensator-body at a lower speed. By shifting the member 28 to the position shown in Fig. 1 the driving-gear 15 will be clutched to sleeve 14, which, being a part of the main body of the compensator, will drive the compensator forward at full speed.

I claim as my invention—

1. The combination with a pair of shafts, a pair of gears carried by the adjacent ends of said shafts, planetary compensating gears connecting said first-mentioned gears, a carrier for said planetary compensator-gears rotatably mounted upon said shafts, a driving-gear concentric with said shafts, a second gear also concentric with said shafts, a planetary gear carried by the compensator-carrier and meshing with said two last-mentioned gears, and means for directly connecting the driving-gear and compensator-carrier.

2. The combination, with a pair of coaxial shafts, a compensator-casing journaled thereon, and compensator-gearing between said shafts, of a driving-gear coaxial with said shafts, a pair of internal gears coaxial with said shafts, means for holding either of said internal gears against rotation, and planetary gearing between the driving-gear and each of said internal gears.

3. The combination, with a pair of shafts, of a compensator connecting the same, a driving element, means for directly connecting said driving element with or disconnecting said driving element from the compensator, and intermediate connecting-gearing between said driving element and the compensator.

4. The combination, with a pair of shafts, of a compensator connecting the same, a driving element, means for directly connecting said driving element with or disconnecting said driving element from the compensator, intermediate speed-reducing gearing connecting said driving element with the compensator, and other intermediate reversing-gearing connecting said driving element with the compensator.

5. The combination, with a pair of coaxial shafts, of a pair of gears carried by the adjacent ends of said shafts, a compensator-body coaxial with said shafts, planetary compensator-gears carried by said body and connecting the shaft-gears, a main drive-gear coaxial with said shaft, an internal gear a planetary shaft carried by the compensator-body, a pinion carried by said planetary shaft and meshing with the main drive-gear and with said internal gear, means for holding said internal gear against rotation, a second pinion carried by the planetary shaft, an idler-pinion meshing therewith, a second internal gear meshing with said idler-pinion, means for holding said second internal gear against rotation, and means for directly connecting the main drive-gear with the compensator-body.

6. The combination, with a pair of main shafts, of a pair of gears carried by the adjacent ends of said main shafts, a compensator-body journaled upon said main shafts, planetary compensator-gears carried by said compensator-body and connecting the main-shaft gears, a main drive member rotatably mounted upon the compensator-body, means for directly clutching said main drive member to the compensator-body, a main driving-gear driven by said driving member, a planetary shaft journaled in the compensator-body, a pinion carried by said planetary shaft and meshing with said main driving-gear, an internal gear coaxial with the main shafts and meshing with said pinion, means for holding said internal gear against rotation, a second pinion carried by said planetary shaft, an idler carried by the compensator-body and meshing with said second pinion, a second internal gear coaxial with the main shafts and meshing with said idler, and means for holding said second internal gear against rotation.

In witness whereof I have hereunto set my hand and seal, at Connersville, Indiana, this 24th day of January, A. D. 1906.

JOSHUA H. MORRISON. [L. S.]

Witnesses:
ALEX MATNEY.
WM. LEEDKE.